(12) United States Patent
Wackerly

(10) Patent No.: US 11,252,258 B2
(45) Date of Patent: Feb. 15, 2022

(54) DEVICE-AWARE DYNAMIC PROTOCOL ADAPTATION IN A SOFTWARE-DEFINED NETWORK

(71) Applicant: Hewlett Packard Enterprise Development LP, Houston, TX (US)

(72) Inventor: Shaun Wackerly, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 109 days.

(21) Appl. No.: 16/144,699

(22) Filed: Sep. 27, 2018

(65) Prior Publication Data

US 2020/0106855 A1 Apr. 2, 2020

(51) Int. Cl.
*H04L 29/08* (2006.01)
*H04L 12/24* (2006.01)
*H04L 12/931* (2013.01)
*H04L 12/725* (2013.01)
*H04L 12/715* (2013.01)

(52) U.S. Cl.
CPC .......... *H04L 67/327* (2013.01); *H04L 41/082* (2013.01); *H04L 41/0853* (2013.01); *H04L 41/0893* (2013.01); *H04L 41/12* (2013.01); *H04L 45/306* (2013.01); *H04L 49/35* (2013.01); *H04L 45/64* (2013.01)

(58) Field of Classification Search
CPC . H04L 67/327; H04L 41/082; H04L 41/0853; H04L 41/12; H04L 49/35; H04L 45/306; H04L 41/0893; H04L 45/64
See application file for complete search history.

(56) References Cited

U.S. PATENT DOCUMENTS

| 8,549,119 | B1 * | 10/2013 | Singh | H04L 41/0866 709/222 |
| 8,555,273 | B1 * | 10/2013 | Chia | G06F 8/654 717/173 |
| 8,787,161 | B2 * | 7/2014 | Adamczyk | H04L 47/2458 370/230 |

(Continued)

OTHER PUBLICATIONS

Wei, Q. et al., Dynamic Flow Rules in Software Defined Networks, (Research Paper), Jun. 6, 2017, pp. 1-7, Retrieved from the Internet on Mar. 6, 2018 URL: <5g-xhaul-project.eu/download/EWSDNsubmission.pdf >.

*Primary Examiner* — Jimmy H Tran
(74) *Attorney, Agent, or Firm* — Hewlett Packard Enterprise Patent Department

(57) ABSTRACT

An example consistent with this disclosure includes a controller that is communicatively coupled to dataflow devices in a network. The controller receives device information from a dataflow device and determines features supported by the dataflow device based, in part, on the device information received from the dataflow device. Using a driver configured to use the features supported by the dataflow device, the controller transmits a command to the dataflow device. The controller then receives a response to the command from the dataflow device. The response to the command may include information that indicates different features are supported by the dataflow device than previously determined. The controller updates its determination of the features supported by the dataflow device and updates the driver used to transmit the command to the dataflow device.

19 Claims, 6 Drawing Sheets

(56) References Cited

U.S. PATENT DOCUMENTS

| | | | |
|---|---|---|---|
| 9,100,346 B2 | 8/2015 | Voit et al. | |
| 9,270,598 B1* | 2/2016 | Oran | H04L 45/22 |
| 9,276,877 B1* | 3/2016 | Chua | H04L 45/38 |
| 9,460,417 B2 | 10/2016 | Strassner | |
| 9,674,147 B2 | 6/2017 | Grant et al. | |
| 9,686,140 B2 | 6/2017 | Pacella et al. | |
| 9,729,582 B2 | 8/2017 | Loo et al. | |
| 9,819,565 B2 | 11/2017 | Djukic et al. | |
| 10,127,022 B2* | 11/2018 | Sharma | G06F 8/35 |
| 10,469,320 B2* | 11/2019 | Dwaraki | H04L 41/0893 |
| 10,608,893 B2* | 3/2020 | Di Martino | H04L 43/50 |
| 2006/0256770 A1* | 11/2006 | Caci | H04L 41/18 370/352 |
| 2014/0098669 A1* | 4/2014 | Garg | H04L 47/12 370/235 |
| 2015/0023147 A1* | 1/2015 | Lee | H04L 41/0893 370/216 |
| 2016/0050117 A1* | 2/2016 | Voellmy | H04L 12/6418 370/392 |
| 2016/0277234 A1* | 9/2016 | Amulothu | H04L 41/082 |
| 2016/0306689 A1* | 10/2016 | Jain | G06F 11/0742 |
| 2016/0330075 A1* | 11/2016 | Tiwari | H04L 41/0806 |
| 2017/0048126 A1* | 2/2017 | Handige Shankar | H04L 41/0622 |
| 2017/0149659 A1* | 5/2017 | K | H04L 45/38 |
| 2017/0195186 A1* | 7/2017 | Zheng | H04L 41/12 |
| 2017/0195255 A1* | 7/2017 | Pham | H04L 41/20 |
| 2017/0250869 A1* | 8/2017 | Voellmy | H04L 43/14 |
| 2017/0302504 A1* | 10/2017 | Wang | H04L 43/0811 |
| 2017/0317887 A1* | 11/2017 | Dwaraki | H04L 45/38 |
| 2017/0317930 A1* | 11/2017 | Bianchi | H04L 45/64 |
| 2017/0339247 A1* | 11/2017 | Tiwari | H04W 76/11 |
| 2018/0167282 A1* | 6/2018 | Reumann | H04L 61/6022 |
| 2018/0314619 A1* | 11/2018 | Jagadeesan | G06F 11/3608 |
| 2018/0337848 A1* | 11/2018 | Bhaskar | H04L 12/6418 |
| 2018/0367371 A1* | 12/2018 | Nagarajan | H04L 43/0805 |
| 2018/0367448 A1* | 12/2018 | Anton Eichelberger | H04L 12/4625 |
| 2019/0020689 A1* | 1/2019 | Porras | H04L 63/20 |
| 2019/0089741 A1* | 3/2019 | Hill | H04L 63/0876 |
| 2019/0097883 A1* | 3/2019 | Tiwari | H04L 41/0806 |
| 2019/0173764 A1* | 6/2019 | Di Martino | H04L 41/145 |
| 2019/0220627 A1* | 7/2019 | LeMasters | G06F 13/4068 |
| 2019/0260649 A1* | 8/2019 | Raman | G06F 11/3433 |
| 2019/0260670 A1* | 8/2019 | Kulkarni | H04L 45/38 |

\* cited by examiner

DEVICE-AWARE DYNAMIC PROTOCOL ADAPTATION IN A SOFTWARE-DEFINED NETWORK

BACKGROUND

Software-Defined Networking (SDN) networks separate the control layer from the dataflow layer. A common network layout for such SDN network include an SDN controller communicatively coupled to one or more dataflow devices (e.g. switches, routers, gateways). Some SDN controllers may use an industry standardized protocol to communicate with the dataflow devices, such as OpenFlow. Such SDN controllers may also communicate with the dataflow devices using an application programming interface (API), such as a REST API. However, many SDN controllers use proprietary protocols to communicate with the dataflow devices. No matter which protocol is used between the controller and the dataflow devices, there may be incompatibilities where optional components of the protocol that are unsupported by some of the dataflow devices or where components of the protocol are only supported by some of the dataflow devices under certain conditions.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
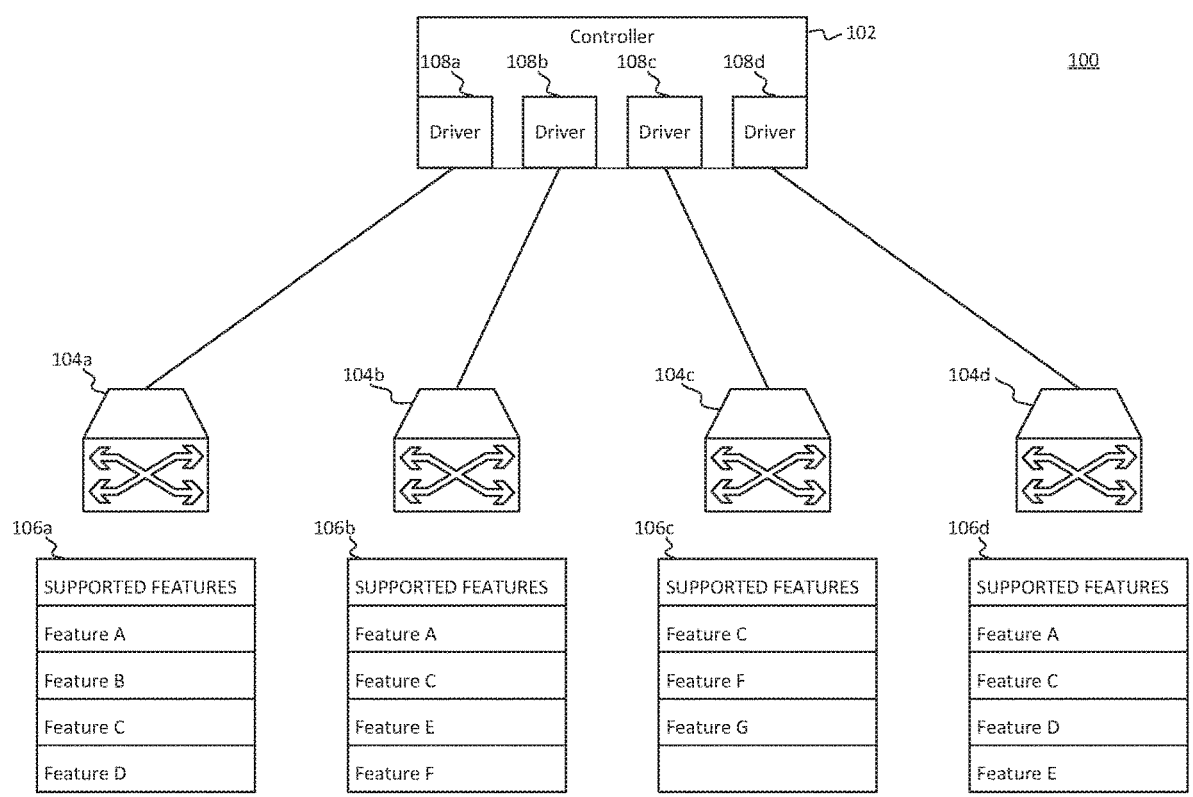
FIG. 1 illustrates an example Software-Defined Networking (SDN) network including a network controller communicatively coupled to dataflow devices.

certain examples have features that are in addition to or in lieu of the features illustrated in the above-referenced figures. Certain labels may be omitted from certain figures for the sake of clarity.

DETAILED DESCRIPTION

Software-Defined Networking (SDN) includes creating flows at a SDN controller and transmitting those flows to dataflow devices in the network, SDN does not require that the dataflow devices all be the same model, run the same firmware, be manufactured by the same manufacturer, or support the same features (beyond a core set of basic features required to be considered SDN-capable). As such, certain dataflow devices may not support the full feature set of the SDN protocol used by the SDN controller. For example, a certain dataflow device may not be capable of matching an Ethernet source address in response to a command from the SDN controller, another certain dataflow device may only be capable of matching an Ethernet source address when the Ethernet type IPv4, and another dataflow device may be capable of matching an Ethernet source address no matter the value of the Ethernet type.

The SDN controller includes device drivers to facilitate communication with different types of dataflow device. Such drivers may be created for a device model, a firmware version, a manufacturer, or any other characteristic or combination of characteristics of a dataflow device. Currently, SDN controllers may require a software developer to manually generate device drivers for use by the controller and for the software developer to manually update the device drivers as updates to the firmware of a dataflow device are installed.

In this disclosure, the SDN controller dynamically updates device drivers for the dataflow devices based on one or more sources of information, including responses received from the dataflow devices to SDN protocol commands sent from the SDN controller, information received from other SDN controllers about feature support of certain dataflow devices, and information received from a repository that aggregates feature support information from multiple SDN controllers. In some examples, a machine learning algorithm determines relevant characteristics of dataflow devices in relation to the features they support. The machine learning algorithm may be located on the SDN controller, or it may be located with the repository, depending on the specific example.

Different dataflow devices may provide different amounts of information to the SDN controller. For example, a certain dataflow device may only send back a rejection of a SDN protocol command without any additional information and another certain dataflow device may include with the rejection a reason code and/or a reason statement that explains the cause of the rejection. To illustrate, an example SDN controller may transmit command to initiate a new flow for IP addresses with a wildcard (e.g. "10.5.*.*") to two dataflow devices that do not support wildcards in IP addresses. The first dataflow device may only send back a rejection without any additional information as to why the flow was rejected. The second dataflow device may send back a rejection with the following additional information included: "ERR CODE: 0x4D01—Malformed address, includes unsupported character '*'". The SDN controller may handle the two rejections differently. For the first dataflow device, since it is not clear exactly why the command was rejected, the SDN controller may not be able to take decisive action. Depending on administrator configuration of the SDN controller, the SDN controller may send slightly modified flows until one is not rejected in an attempt to determine the cause of the rejection, the SDN controller may make a best guess determination of cause based on results from a machine learning algorithm and update the relevant driver for the first dataflow device to reflect the lack of functionality, the SDN controller may revert to a basic set of functionality in part or in whole when communicating with the first dataflow device, the SDN controller may switch to using a different driver when communicating with the first dataflow device, or the SDN controller may take other actions in an attempt to remediate the feature deficiency of the first dataflow device.

On the other hand, the additional information from the second dataflow device allows the SDN controller to take directed action toward resolving the known feature deficiency. In the example of the second dataflow device, the SDN controller may modify the SDN protocol command to remove the wildcards (e.g. change to "10.5.0.1-10.5.255.255" for a command that supports using an address range) and transmit the modified command to the second dataflow device. The SDN controller may also update the feature support data for the second dataflow device to reflect the fact that the second dataflow device does not support wildcards. The SDN controller may use a machine learning algorithm to broaden the application of the new feature support rule if the rule is applicable beyond the second dataflow device in specific. For example, the machine learning algorithm may determine that it is likely that all dataflow devices from a certain manufacturer running firmware version 10.1.23 do not support wildcards. In some examples, the SDN controller may indicate that such an expansion in the scope of the rule has not yet been fully tested. The SDN controller, if so configured, may identify other dataflow devices within the scope of the new rule and test the applicability of the rule to those devices by sending relevant SDN protocol commands to those devices. Such SDN protocol commands may be ephemeral commands.

An example SDN controller may transmit ephemeral commands on a periodic basis to various dataflow devices of the network to continuously verify the scope, and continued applicability of each rule of a given device driver. For example, the example SDN controller may perform various forms of testing, such as unit testing, regression testing, and system testing at appropriate times to confirm the continuing functionality of the dataflow devices matches the functionality supported by the respective device drivers in the SDN controller.

As will be described in additional detail in relation to the figures of this disclosure, components and features described in this disclosure may be arranged in any appropriate manner, including within one device, across multiple devices, on virtualized devices, on cloud servers, etc. In this disclosure, details of SDN protocols are described in the abstract, but this disclosure contemplates the features disclosed herein being implemented in any appropriate protocol, transmission medium, and network topology.

The features and components described in this disclosure represent a technical improvement over the existing technology in the area of software-defined networking. Some example technical improvements follow. This is not a comprehensive listing of all technical improvements. Features of this disclosure improve the compatibility of SDN controllers with various dataflow devices. The SDN controller detects and implements features of an SDN protocol that are supported by a dataflow device without administrative intervention, resulting in improved data routing and switching performance, A SDN controller implementing the features of this disclosure may use commands of the SDN protocol in communication with a dataflow device that has been updated to support the use of such commands, without the SDN controller being manually reprogrammed by an administrator or software developer, FIG. 1 illustrates an example Software-Defined Networking (SDN) network including a network controller communicatively coupled to dataflow devices. Network 100 includes controller 102 communicatively coupled to dataflow devices 104a-104d. Each dataflow device 104 supports certain features illustrated in respective SUPPORTED FEATURES tables 106a-106d. Controller 102 is an SDN controller that communicates with dataflow devices 104a-104d using an SDN protocol via drivers 108a-108d. In some examples, the SDN protocol may be OpenFlow. In some other examples, the SDN protocol may be a proprietary protocol that is supported by both controller 102 and dataflow devices 104a-104d. In yet other examples, the SDN protocol may be a REST API supported by both controller 102 and dataflow devices 104a-104d.

Network 100 has a topology that separates the control decisions for switching and routing from the actual packet switching and routing. Controller 102 may store business policies that apply to certain packets in network 100. Controller 102 may send a flow across the network to one or more dataflow device 104a-104d. Dataflow devices 104a-104d may store the flow in their respective flow tables. When a packet is received at a dataflow device 104, characteristics of the packet are compared to the flow stored in the flow table of dataflow device 104, and if the characteristics are consistent with match criteria of the flow, the packet is treated based on the flow.

In some examples, different dataflow devices 104a-104d support different rules and actions received as flows from controller 102. These rules and actions (a.k.a. "features") describe how to match a packet to a flow or how to act once a packet has been matched to a flow. Certain dataflow devices 104a-104d may support communication through APIs, receiving input parameters and transmitting return values in response. An example flow on a certain dataflow device 104 may instruct that all packets with a source IP address of 10.5.0.1 to 10.5.0.255 should be modified to have a destination IP address of 10.7.0.44 and should be routed through interface 3 (not shown) of dataflow device 104. If the example flow is sent to dataflow devices 104a-d in the following format, certain of the dataflow devices 104a-d may not fully support the flow: "10.5.0.* MOD dest-IP 10.7.0.44 ROUTE 3". As previously mentioned, all flows described in this document are described with no specific SDN protocol in mind, and are formatted for clarity to the reader. Dataflow device 104a may reject the flow because dataflow device 104a does not support wildcards in the rules section of the flow. Dataflow device 104b may reject the flow because dataflow device 104b does not support modifying the destination IP of packets. Dataflow device 104c may reject the flow because dataflow device 104c does not have an interface 3. Dataflow device 104d may accept the flow because dataflow device 104d supports all of the rules and actions of the flow.

In order to account for the different functionalities (i.e. features) of each dataflow device 104, controller 102 may retain information about the features of each dataflow device 104. In some examples, the retained information may be used to generate and update drivers 108 in controller 102 used to communicate with each respective dataflow device 104. For example, dataflow devices 104a-d may each have supported features as illustrated in FIG. 1 as tables 106a-d, respectively. Certain features may be universally supported across all dataflow devices 104 of network 100 (e.g. Feature C). Other features may be supported on a majority of the dataflow devices 104 (e.g. Feature A). Yet other features may only be supported on a few of the dataflow devices 104 (e.g. Feature G). Some features may not be supported by any of the dataflow devices 104 (e.g. Feature H, not shown). Each driver 108a-d is generated to communicate with its respective dataflow device 104a-d using supported features of the respective dataflow device 104a-d. As an example, in reference to the example flow of paragraph 0020, driver 108a may use IP ranges when transmitting a flow since dataflow device 104a does not support wildcards in the rules section of the flow.

Some features may only be partially supported. The partial support may be limited in any number of ways. Some examples include size limits for certain tables in the respective dataflow device 104, support for certain features only when a characteristic of the dataflow device 104 has a certain value, support for certain features only when using a specific syntax, etc. Many additional limitations to how a dataflow device 104 supports a feature would be readily apparent to a person knowledgeable in the area of SDN networking. For example, Feature A may be an action that is only supported for ten flows at a time in dataflow device 104*a*. After ten Feature A flows have been entered into the flow table of dataflow device 104*a* (and other relevant tables of dataflow device 104*a*), any additional flow containing a Feature A action are rejected.

Feature support may be equivalent across related dataflow devices 104. For example, dataflow device 104*a* and dataflow device 104*d* may be the same model device or may be running the same firmware version. As such, controller 102 may determine that Features A, C, and D are common across all dataflow devices 104 that share whichever attribute is in common across dataflow devices 104*a* and 104*d*. Controller 102 may use a heuristic algorithm, such as a machine learning algorithm, to determine whether certain attributes of dataflow devices 104 are associated with supporting or not supporting certain features.

Controller 102 may receive updated information about supported features from other controllers in network 100, from a cloud service, or from any other appropriate location. Controller 102 may also transmit any information gathered from its own activities to such information repositories. Controller 102 may transmit the gathered information in raw form, aggregated form, or preprocessed into supported features data similar to what is received from information repositories.

Controller 102 may receive varying amounts of information from dataflow devices 104 when the dataflow device 104 reject a flow sent from controller 102. Certain dataflow devices 104 may only send a rejection message with no additional information. Certain other dataflow devices 104 may send a rejection message with an error code and/or error string. Controller 102 may respond to a rejection message differently depending on how controller 102 is configured and depending on what information is received with the error message. For example, controller 102 may be configured to quickly resolve rejections without cluttering the network with additional traffic. In such cases, controller 102 may update the relevant driver with any gathered information (e.g. command sent, features used by command, etc.). In another example, controller 102 may configured to investigate rejections immediately or during a period of low network traffic. Such a controller 102 may modify the command sent to determine the reason for the rejection. For example, controller 102 may reference a list of commonly unsupported features and syntax to match to the command. Controller 102 may then remediate the unsupported features and syntax sequentially, sending modified commands to the dataflow device 104. Based on the response received to each modified command, controller 102 can determine which feature or syntax is not supported.

As an example operation of a controller 102, reference is made to the example described in paragraph 0020. When controller 102 receives a rejection from dataflow device 104*a* after transmitting command "10.5.0.* MOD dest-IP 10.7.0.44 ROUTE 3", controller 102 does not know that dataflow device 104*a* does no support the '*' wildcard character, because dataflow device 104*a* does not send an error code or reason with its rejection message. Controller 102 may consult a list of common unsupported features. The list may be generic to all dataflow devices, or may be targeted to dataflow devices of certain manufacturers, certain models, certain device types, or any other characteristic. Upon consulting the list and comparing it to the command, controller 102 may determine that there are three features of the command that are commonly unsupported. First, a dataflow device 104 may not support the "ROUTE" action if it does not have an interface 3. Second, a dataflow device 104 may not support the "MOD" action on the "dest-IP" field. Third, a dataflow device 104 may not support using a '*' wildcard character. Controller 102 may then modify the command to test each of the potentially unsupported features. In some examples, controller 102 may modify the command in such a way as to make it an ephemeral command that does not change the operation of dataflow device 104*a*. In some other examples, controller 102 modifies the command and retains information about the change in the operation of dataflow device 104*a* due to the modified command in comparison to the original rejected command. In some examples, multiple modified commands are necessary to achieve the full change in operation of the original rejected command.

Controller 102 may receive an error code or reason in the rejection from a dataflow device 104 that allows controller 102 to make a targeted modification to the command for dataflow device 104 to accept it. In some examples, the targeted modification may merely alter syntax of the command to be compatible with dataflow device 104. In some other examples, the targeted modification may alter the change of operation to dataflow device 104. Controller 102 may transmit multiple commands in order to achieve the same change of operation as the original rejected command. Whether controller 102 receives a rejection with error information or not, controller 102 alters the relevant device driver associated with the dataflow device 104 to prevent the original rejected command from being transmitted to the dataflow device 104 again.

Controller 102, in altering the relevant device driver, does not alter the manner in which an application would interact with the network. For example, just because command "10.5.0.* MOD dent-IP 10.7.0.44 ROUTE 3" is rejected by a dataflow device 104 because of a wildcard, a firewall application does not have to modify its interactions (via controller 102) with dataflow device 104. Controller 102 instead "translates" the application's interactions to be acceptable by dataflow device 104. For example, an IP address wildcard may be converted into a range of IP addresses. In another example, a command which includes an IP address wildcard may be converted into multiple separate commands which each match a single IP address.

Controller 102 may periodically transmit ephemeral commands to test the continued operation of dataflow devices 104 in network 100 according to the information retained by controller 102. These continuous verification tests will detect any change in functionality and modify the retained supported feature information accordingly.

Figure 2:
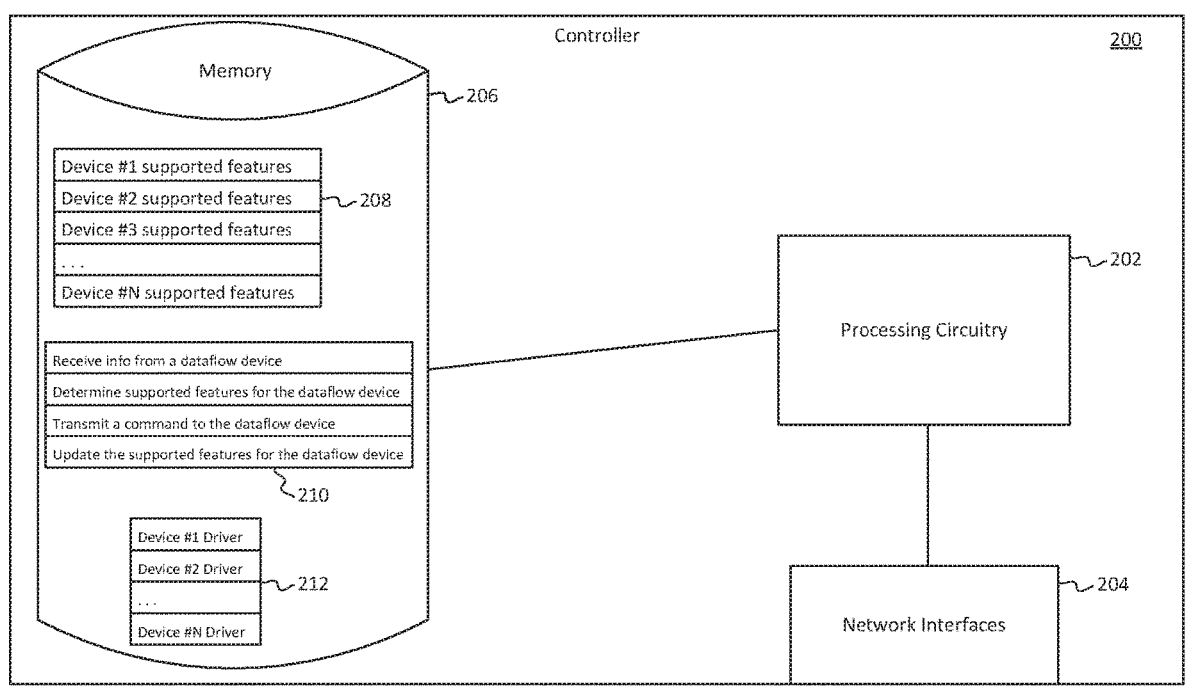
FIG. 2 illustrates an example network controller including a device supported features database.

FIG. 2 illustrates an example network controller including a device supported features database. Controller 200 includes processing circuitry 202 communicatively coupled to network interfaces 204 and memory 206. Memory 206 includes supported features database 208, instructions 210, and drivers 212.

Controller 200 executes instructions 210 using processing circuitry 202. Processing circuitry 202, upon executing instructions 210, receives information from a dataflow device via network interface 204 and drivers 212. Processing circuitry 202 then determines supported features for the dataflow device based, in part, on supported features for the dataflow device as contained in supported features database 208. Processing circuitry 202 also transmits a command to the dataflow device using drivers 212. The command may be generated based on the determined supported features as well as a business intention for the network. In some examples, the business intention may be a routing request sent to controller 200. For example, a firewall application may send a routing request for data packets destined for certain devices of the network to be routed through a specific firewall server prior to delivery to the certain devices. A person familiar with the art of SDN networking may recognize many applications and services that may generate business intentions for the network.

In some examples, database 208 in controller 200 is a full collection of all supported features for all known device types. In such examples, database 208 is self-contained and does not rely on access to any cloud service or any other controllers to have a complete set of data on all supported features for all known device types. Such self-contained databases 208 may still receive periodic updates from an update repository, or alternatively may be updated by a network administrator manually uploading new data into database 208. In other examples, database 208 is a cache, rather than a full database. In such examples, database 208 includes supported feature information for the most commonly used device types for controller 200. Additional supported feature information may be located in one or more separate devices, including in a cloud server, other controllers on the network, etc. In yet other examples, database 208 includes only minimal information required for controller 200 to generate a specific command at a specific time, and database 208 is purged after the specific command is transmitted. In such examples, database 208 may include the results of a query sent to a cloud service, such as a supported feature repository.

The information provided in database 208 may be generated using a machine learning algorithm. Information from successful and rejected command transmittals are provided to the machine learning algorithm, which generates heuristic resulting information provided in database 208. The machine learning algorithm may group feature support by characteristics such as model, firmware, manufacturer, state, configuration, and any other relevant characteristic when generating the heuristic resulting information. For example, if received data relating to dataflow devices running firmware version 17.0.1 indicates that such dataflow devices do not support a certain feature, the machine learning algorithm may output information indicating that all dataflow devices running firmware version 17.0.1 do not support the certain feature. Controller 200 may then transmit one or more ephemeral commands via drivers 212 to verify the heuristic resulting information. Drivers 212 may be updated to reflect the verified heuristic resulting information.

The information received from successful and rejected commands may be handled in many ways depending on the specific network setup. In some examples, the information is captured at controller 200 and processed by an algorithm (e.g. the machine learning algorithm) on controller 200. In some other examples, the information is transmitted to a cloud server to be processed by an algorithm. The information may be transmitted individually when received at controller 200, or may be aggregated and sent in periodic updates from controller 200 to the cloud server. As would be evident to a person skilled in the art of networking, such a server could be set up in the local- or wide-area network rather than on the cloud.

Figure 3:
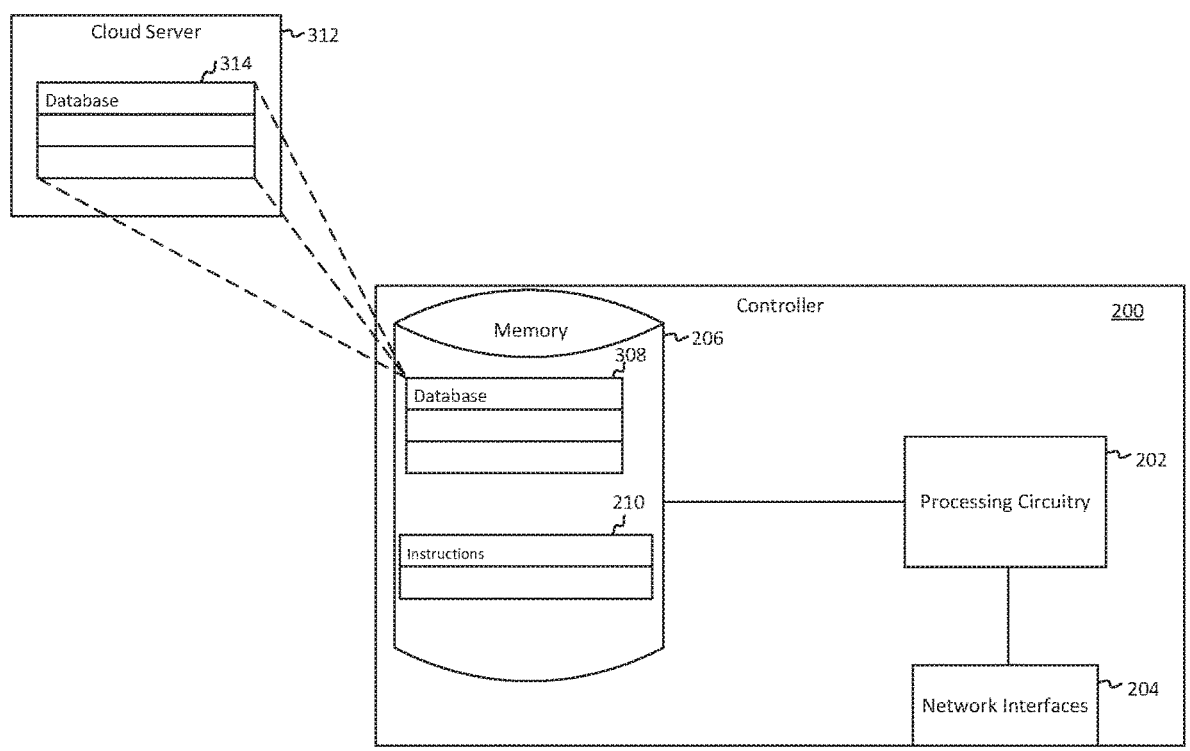
FIG. 3 illustrates an example network controller including a model and firmware supported features database.

FIG. 3 illustrates an example network controller including a model and firmware supported features database related to a database on a cloud server. Controller 200 includes processing circuitry 202, network interfaces 204, and memory 206. Memory 206 includes database 308, which includes information about feature support of dataflow devices filtered by model type and firmware version. Database 308 acts as a cache of the most frequently used database entries (by controller 200) from database 314 includes on cloud server 312. In some examples, supported feature information is provided by cloud server 312 as a service.

An example operation of controller 200 is as follows. Controller 200 determines that a dataflow device requires a change in operation. Controller 200 determines the model and firmware version of the dataflow device and queries database 308 for feature support information about the dataflow device. Controller 200 generates or selects a device driver compatible with the dataflow device, based in part on the feature support information. Alternatively controller 200 may already have a device driver assigned to the dataflow device that incorporates the feature support information about the dataflow device. Controller 200 generates a command destined for the dataflow device using the selected/generated device driver. In some examples, a device driver for a dataflow device is generated by creating a copy of a generic device driver and modifying the behavior of the device driver to match the supported feature information for the respective dataflow device. Controller 200 then transmits the command to the dataflow device. Upon receiving a response to the transmitted command from the dataflow device, controller 200 handles the response based on the contents. If the response is a rejection, controller 200 gathers relevant information to determine which feature is not supported by the dataflow device. In some examples, the gathered raw information is forwarded to cloud server 312 for further analysis, and database 314 is updated to reflect the new feature support information. In some other examples, the gathered raw information is processed by controller 200 and the resultant changes to the feature support information in database 308 is sent to cloud server 312 to be reflected in database 314. Controller 200 then sends a modified command to the dataflow device.

Figure 4:
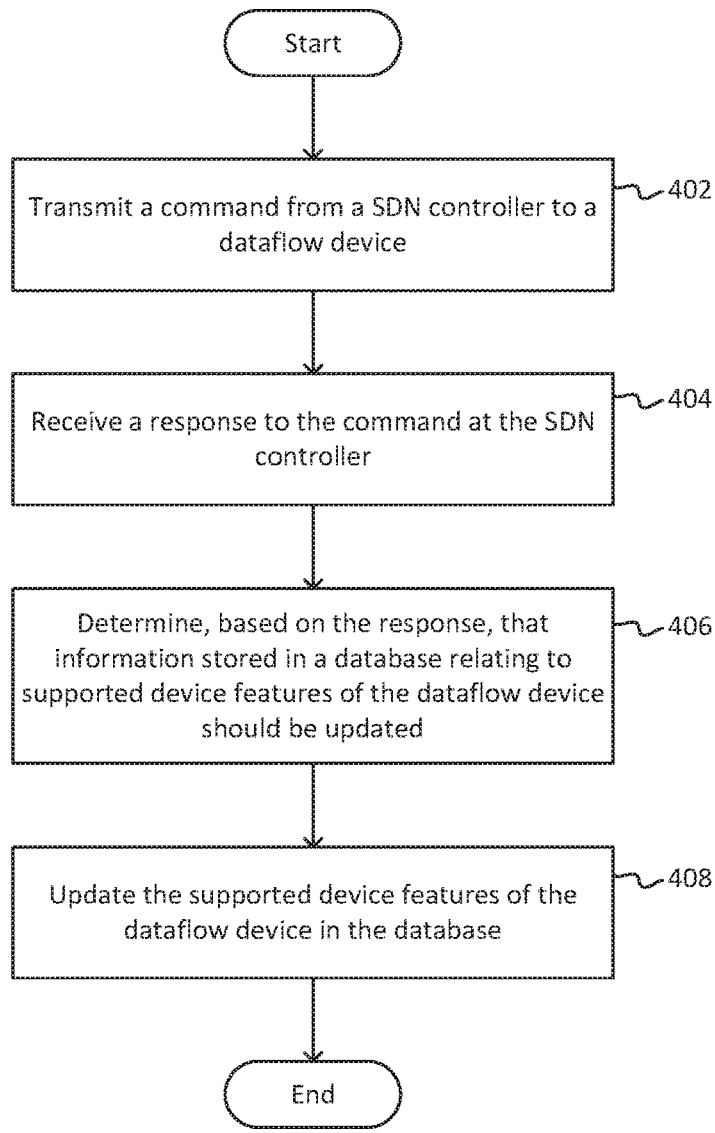
FIG. 4 is a flowchart describing an example method for operating a SDN network including dataflow devices with certain supported features.

FIG. 4 is a flowchart describing an example method for operating a SDN network including dataflow devices with certain supported features. Method 400 includes blocks 402, 404, 406, and 408.

In block 402, a SDN controller transmits a command to a dataflow device. The SDN controller uses a device driver to generate and transmit the command to the dataflow device. In some examples, the device driver incorporates information about features supported by the dataflow device into the generation of the command to improve the likelihood that the command will not be rejected by the dataflow device. In certain examples, the device driver is created specifically for the certain dataflow device to which the command is transmitted. In certain other examples, the device driver is shared across dataflow devices that have a certain characteristic in common that results in a shared feature set.

In block 404, the SDN controller receives a response to the command from the dataflow device. The response may be an acknowledgement of the command or it may be a rejection of the command. Depending on the specific configuration of the SDN controller, an acknowledgement may be discarded without further action, or the acknowledgement may be used to improve the operation of the device driver. A rejection may include additional information, such as a reason for the rejection. Based on the information included (or not included) in the rejection, the SDN controller may run some network tests (e.g. send some ephemeral commands) to determine the reason for the rejection. The SDN controller may also modify the command and send the modified command to the dataflow device in order to change the operation of the dataflow device in the same way that the initial rejected command was supposed to.

In block 406, it is determined, based on the response received in block 404, that information stored in a database relating to supported device features of the dataflow device should be updated. In some examples, the database and the algorithm making the determination are located on the SDN controller. In some other examples, one or both of the database and the algorithm are located on a remote device, such as another SDN controller, a network server, and a cloud server.

In block 408, the supported device features of the dataflow device are updated in the database. In some examples, an existing device feature is amended to note a conditional limitation of the use of that feature. In some other examples, a device feature is removed from the supported features list. In yet other examples, a new device feature is created that captures the limitations of the dataflow device.

Figure 5:
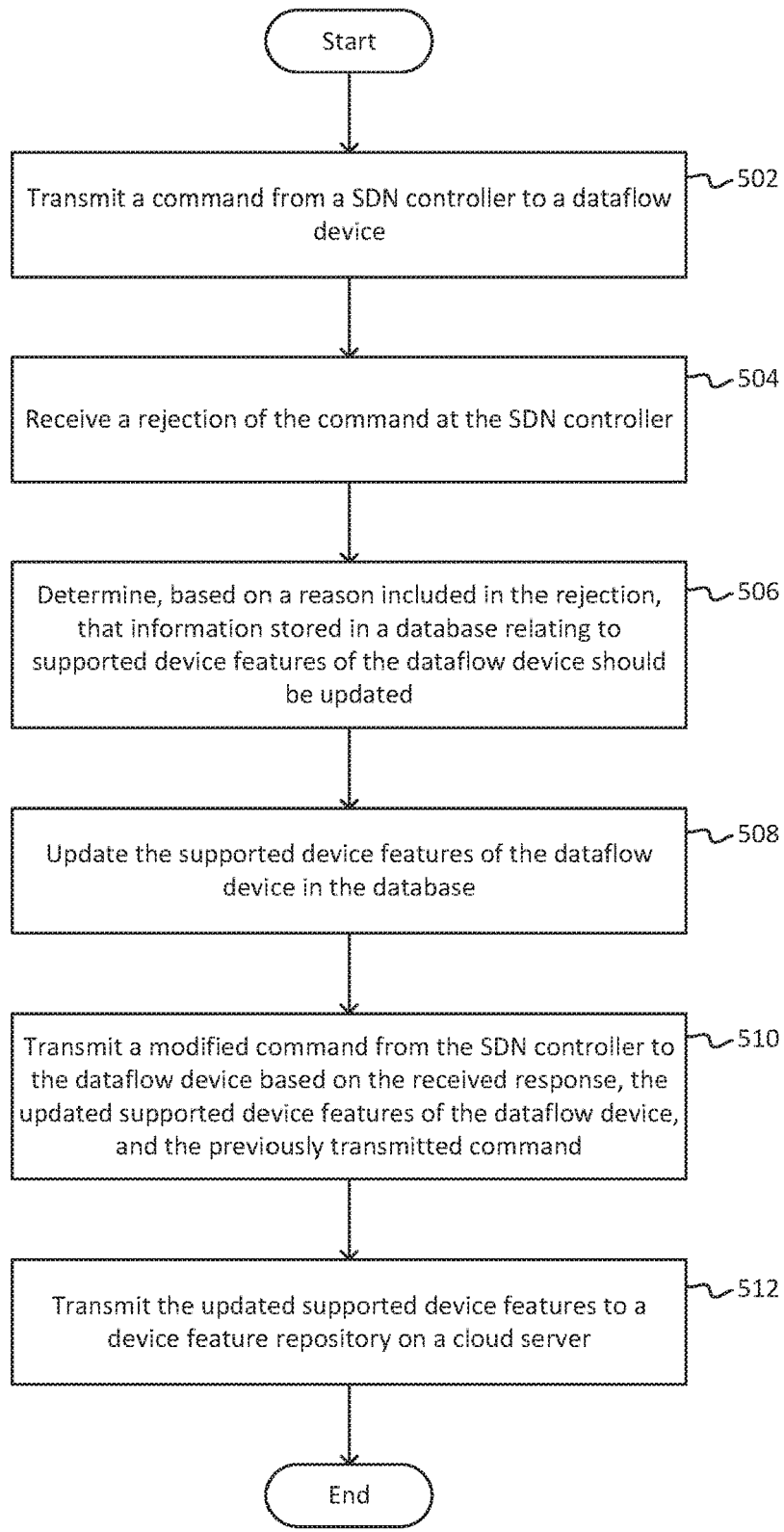
FIG. 5 is a flowchart describing another example method for operating a SDN network including dataflow devices with certain supported features.

FIG. 5 is a flowchart describing another example method for operating a SDN network including dataflow devices with certain supported features. Method 500 includes blocks 502, 504, 506, 508, 510, and 512.

In block 502, a SDN controller transmits a command to a dataflow device. The SDN controller uses a device driver to generate and transmit the command to the dataflow device. In some examples, the device driver incorporates information about features supported by the dataflow device into the generation of the command to improve the likelihood that the command will not be rejected by the dataflow device. In certain examples, the device driver is created specifically for the certain dataflow device to which the command is transmitted. In certain other examples, the device driver is shared across dataflow devices that have a certain characteristic in common that results in a shared feature set.

In block 504, the SDN controller receives a response to the command from the dataflow device. The response may be an acknowledgement of the command or it may be a rejection of the command. Depending on the specific configuration of the SDN controller, an acknowledgement may be discarded without further action, or the acknowledgement may be used to improve the operation of the device driver. A rejection may include additional information, such as a reason for the rejection. Based on the information included (or not included) in the rejection, the SDN controller may run some network tests (e.g. send some ephemeral commands) to determine the reason for the rejection.

In block 506, it is determined, based on the response received in block 504, that information stored in a database relating to supported device features of the dataflow device should be updated. In some examples, the database and the algorithm making the determination are located on the SDN controller. In some other examples, one or both of the database and the algorithm are located on a remote device, such as another SDN controller, a network server, and a cloud server.

In block 508, the supported device features of the dataflow device are updated in the database. In some examples, an existing device feature is amended to note a conditional limitation of the use of that feature. In some other examples, a device feature is removed from the supported features list. In yet other examples, a new device feature is created that captures the limitations of the dataflow device.

In block 510, the SDN controller transmits a modified command to the dataflow device based on the response received in block 504, the supported device features updated in block 508, and the command previously transmitted in block 502. In some examples, the SDN controller transmits one or more test commands that do not alter the operation of the dataflow device in order to determine the limitations of the dataflow device. However, the SDN controller may also transmit one or more commands to the dataflow device to change the operation of the dataflow device in the manner intended by the original rejected command.

In block 512, the SDN controller transmits updated supported device features to a device feature repository on a cloud server. As discussed in relation to FIGS. 2 and 3, there are multiple configurations that this system may take, and the specific information locations and transmissions may be different for different examples in this disclosure. However, in the examples consistent with FIG. 5, the SDN controller determines updated supported device feature information, and transmits the information to a device feature repository (e.g. a database) on the cloud.

Figure 6:
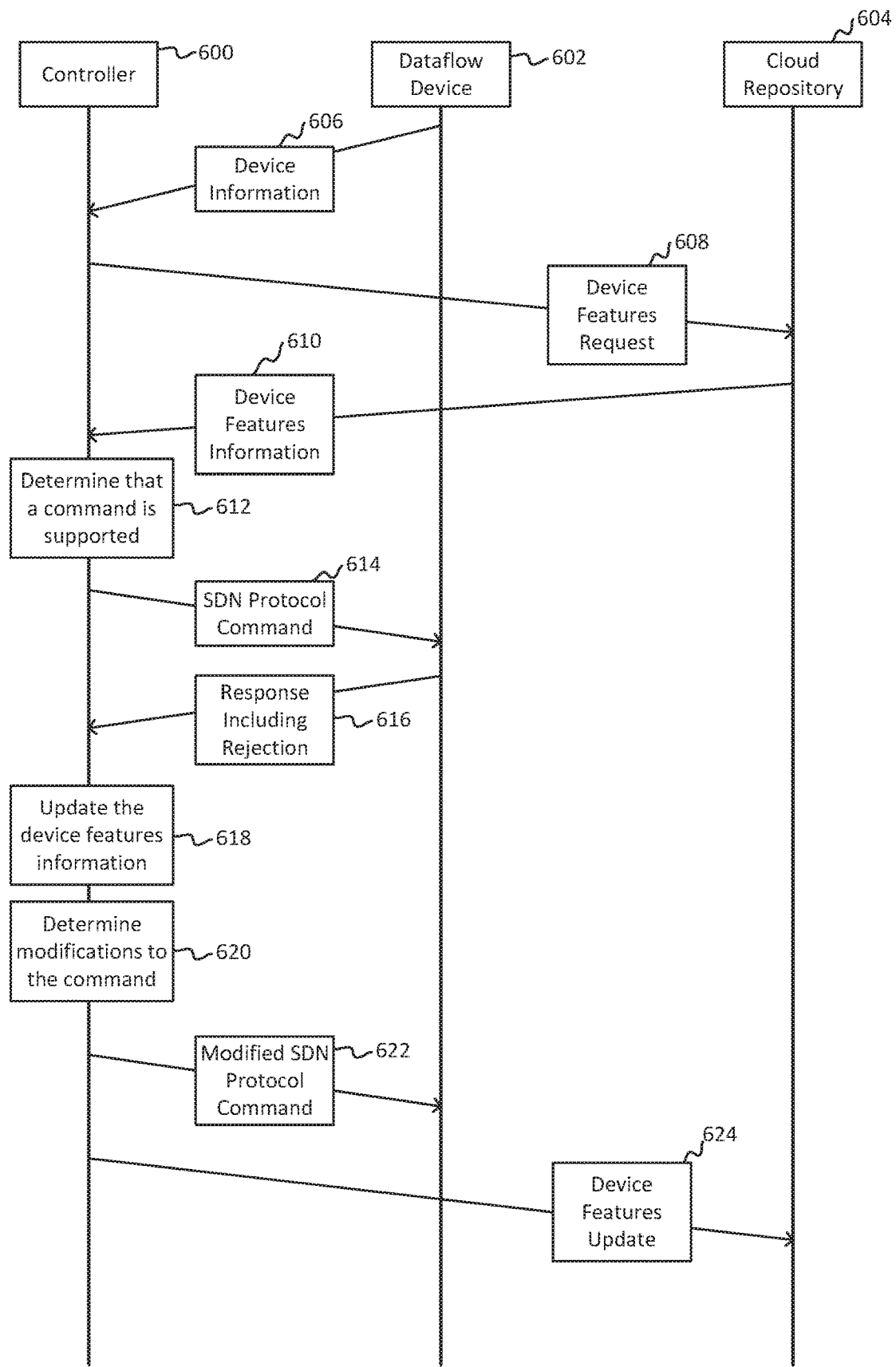
FIG. 6 illustrates an example SDN network including a dataflow device with certain supported features.

FIG. 6 illustrates an example SDN network including a dataflow device with certain supported features. The SDN network includes controller 600, dataflow device 602, and cloud repository 604. Dataflow device 602 sends device information 606 to controller 600. Controller 600 then sends a device features request 608 to cloud repository 604. Cloud repository 604 responds by sending device features information 610 to controller 600. In some examples, device features information 610 is integrated into a database on controller 600.

Controller 600 then determines 612 that a command to dataflow device 602 is supported. Controller 600 generates and transmits an SDN protocol command 614 to dataflow device 602 based, in part, on device features information 610. Dataflow device 602 responds with a response including a rejection 616 to controller 600. Controller 600 then updates 618 the device features information. Controller 600 may update 618 by sending information about command 614 and rejection 616 through an algorithm that determines alterations to make to device features information 610.

Controller 600 uses the updated device features information to determine 620 modifications to make to command 614 to avoid dataflow device 602 rejecting the modified command. Controller 600 then transmits the modified SDN protocol command 622 to the dataflow device. Controller 600 also transmits a device features update 624 to cloud repository 604. In some examples, controller 600 instead transmits information about command 614 and rejection 616 to cloud repository 604, and cloud repository 604 updates 618 the device features information. In such examples, cloud repository 604 then sends updated device features information to controller 600, which controller 600 uses to determine 620 modifications to make to command 614. Controller 600 may determine 620 modifications to make to command 614 by transmitting modified SDN protocol command 622 using an updated device driver based on the updated device features information received from cloud repository 604. In some examples, controller 600 uses the updated device features information to create an updated device driver. In some other examples, the update device features information received from cloud repository 604 is an updated device driver.

SDN controller is a hardware, software, or virtualized device that operates in a software defined network and controls the routing and switching of packets in the software defined network. The SDN controller may run on a standard x86 device rather than on specialized hardware.

Dataflow device is a hardware, software, or virtualized device that operates in a software defined network to physically route or switch packets received at an interface. The dataflow device may include hardware, firmware, and software to quickly and efficiently route or switch a large volume of packets. Example dataflow devices include SDN enabled routers, SDN enabled switches, wireless access points, wireless controllers, and branch gateways.

Firmware is a set of instructions run on a device, such as a dataflow device, that enables functionality in the device. Relevant functionality may include implementing rules and actions from a command received from the SDN controller.

A flow is an SDN protocol command that includes rules for matching packets to the flow and actions to perform on packets that match the flow. A flow is generated by the SDN controller and transmitted to appropriate dataflow devices. Commonly, dataflow devices may store the flow in a flow table that is referenced to determine if a received packet matches the flow and which actions to take when a received packet matches the flow. In this disclosure, "flow" and "command" are used interchangeably to refer to messages sent from a controller to a dataflow device to cause a change in operation, request information, and perform other actions on the dataflow device.

A feature support rule is a set of information that describes which SDN protocol related features a certain dataflow device or group of dataflow devices support. Feature support rules may include conditional information, such as ranges of values that are supported, values that must be true for the feature to be supported, and other relevant information to the proper operation of the feature.

An ephemeral command is a command issued from the SDN controller that does not cause the receiving dataflow device to change its operation. Ephemeral commands, for example, may query for a value of a field or count how many times a command would execute on the dataflow device during a certain period of time.

Rule scope is the realm of applicability of a rule. Rule scope may include types of dataflow devices affected by the rule and conditions that must be met for the rule to apply.

Business policies are abstracted routing and switching priorities. Business policies can be generated by network administrator or by applications or services running on the network. Example business policies include routing certain traffic through a firewall, load balancing, and giving voice over IP quality of service priority.

Match criteria are the mechanism used by dataflow devices to match data packets to flows. Match criteria may compare certain characteristics of a received packet (and of the context of receiving the packet) to rules of flows stored in a flow table.

Device drivers are sets of instructions executed on a device that generates a message to be sent from one device in a format that can be understood by a receiving device.

Processing circuitry is physical hardware, software, and virtualized circuitry that executes instructions. Common examples include microcontrollers, field programmable gate arrays, central processing units, and integrated circuits.

Network interfaces are components (physical or virtualized) that communicate between two devices across a network. Commonly, network interface cards are included in devices to provide connectivity to a network, usually, but not exclusively, through the Ethernet protocol.

Memory is hardware and virtualized circuitry that stores information, data, and instructions in a non-transitory and computer-readable manner. Examples of memory include random access memory, read only memory, storage as a service, hard drives, tape drives, solid state drives, USB drives, processor caches, processor registers, etc.

An SDN Protocol is a set of rules for network control communications between an SDN controller and dataflow devices on an SDN network. As used in this disclosure, "SDN Protocol" may refer to the set of rules itself, any communications compliant with the set of rules, and any components or features of a device that transmit and receive information using communications compliant with the set of rules. Certain examples include OpenFlow, proprietary dataflow control protocols, and dataflow device REST APIs accessible by the SDN controller.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" and "and/or" in respect to features of the disclosure indicates that examples can contain any combination of the listed features, as is appropriate given the context.

Phrases and parentheticals beginning with "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A controller, comprising:
processing circuitry; and
memory including instructions that, when executed on the processing circuitry, cause the processing circuitry to:
receive device information from a dataflow device;
identify one or more device features supported by the dataflow device based on the received device information;
determine one or more unverified device features supported by the dataflow device based on one or more common device attributes between the dataflow device and one or more other dataflow devices;
transmit a command to the dataflow device based on the identified device features and determined unverified device features; and
in response to receiving a response to the command from the dataflow device, update the supported device features contained in a support features database for the dataflow device.

2. The controller of claim 1, wherein the device information received from the dataflow device includes at least one of a device model and a firmware version.

3. The controller of claim 2, wherein the instructions further cause the processing circuitry to retrieve supported device feature information from a database based on the at least one of the device model and the firmware version.

4. The controller of claim 3, wherein the retrieved supported device feature information includes a list of supported commands in an SDN protocol.

5. The controller of claim 1, wherein the command transmitted to the dataflow device is in an SDN protocol.

6. The controller of claim 1, wherein the response to the command includes a rejection and a reason for the rejection.

7. A system, comprising:
a dataflow device; and a software-defined networking (SDN) controller comprising:
processing circuitry; and
a non-transitory computer-readable medium including instructions that, when executed by the processing circuitry, cause the SDN controller to:
receive device information from the dataflow device;
retrieve information from a database relating to supported device features of the dataflow device;
determine whether the dataflow device supports a certain command;
determine one or more unverified device features supported by the dataflow device based on one or more common device attributes between the dataflow device and one or more other dataflow devices; and
transmit a command to the dataflow device.

8. The system of claim 7, wherein the SDN controller is further to:
receive a response to the transmitted command; and
update the information from the database relating to the supported device features of the dataflow device based in part on the received response.

9. The system of claim 8, wherein the SDN controller is further to transmit a modified command to the dataflow device based on the received response, the supported device features of the dataflow device, and the previously transmitted command.

10. The system of claim 8, wherein the database is located on a cloud server.

11. The system of claim 10, wherein the SDN controller is further to transmit the updated information to the cloud server.

12. The system of claim 7, wherein the supported device features of the dataflow device include commands of an SDN protocol that are compatible with the dataflow device.

13. A method for operating a software-defined networking (SDN) network, comprising:

determining one or more unverified device features supported by a dataflow device based on one or more common device attributes between the dataflow device and one or more other dataflow devices;
transmitting a command to the dataflow device based on the identified device features and determined unverified device features;
receiving a response to the command at the SDN controller;
determining, based on the response, that information stored in a database relating to supported device features of the dataflow device should be updated; and
updating the supported device features of the dataflow device in the database.

14. The method of claim 13, further comprising transmitting a modified command from the SDN controller to the dataflow device based on the received response, the updated supported device features of the dataflow device, and the previously transmitted command.

15. The method of claim 13, wherein the information relating to supported device features of the dataflow device includes commands of an SDN protocol that are compatible with the dataflow device, commands of an SDN protocol that are conditionally compatible with the dataflow device, and commands of an SDN protocol that are not compatible with the dataflow device.

16. The method of claim 15, wherein the received response includes a rejection of the command.

17. The method of claim 16, wherein the received response further includes a reason for the rejection of the command.

18. The method of claim 13, further comprising transmitting the updated supported device features to a device feature repository.

19. The method of claim 18, wherein the device feature repository is located on a cloud server.

* * * * *